Oct. 25, 1955 — F. O. LUENBERGER — 2,721,774
THRUST BEARING STRUCTURE
Filed Sept. 28, 1953
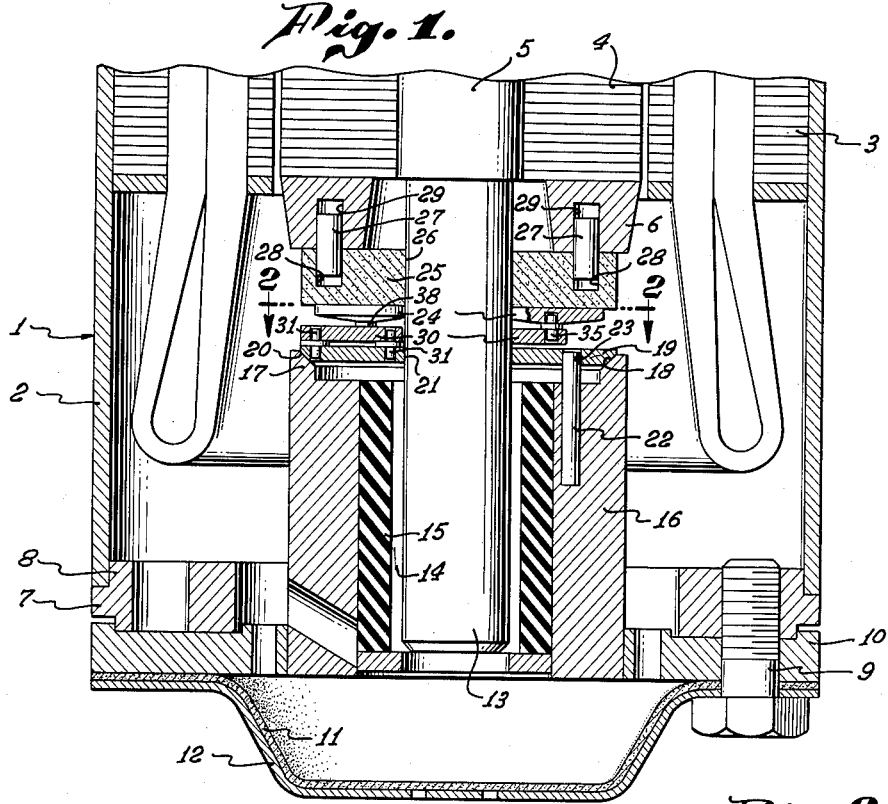
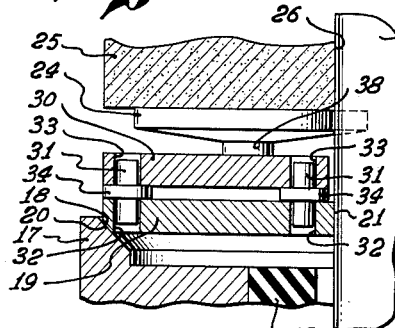
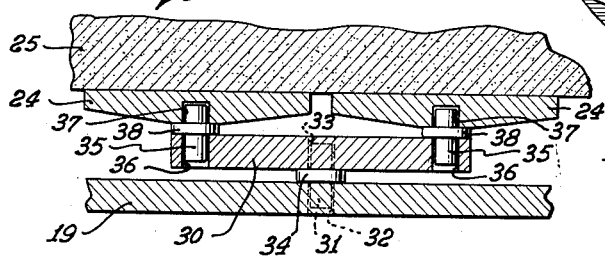
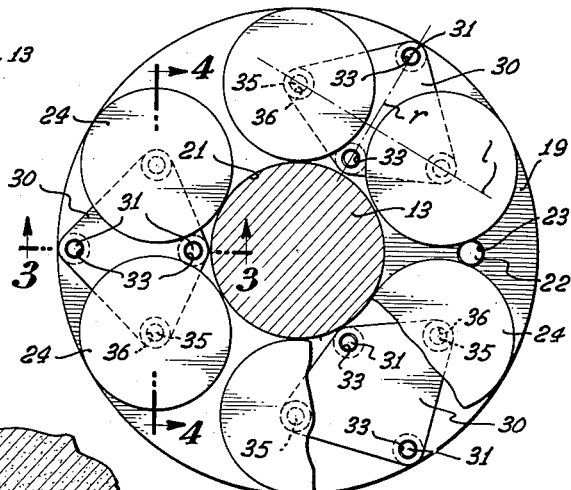
INVENTOR.
FREDERICK O. LUENBERGER,
BY
Flam and Flam
ATTORNEYS.

United States Patent Office 2,721,774
Patented Oct. 25, 1955

2,721,774

THRUST BEARING STRUCTURE

Frederick O. Luenberger, Los Angeles, Calif., assignor to U. S. Electrical Motors, Inc., Los Angeles, Calif., a corporation of California Application September 28, 1953, Serial No. 382,734

6 Claims. (Cl. 308—160)

This invention relates to thrust bearings for vertical shafts in which an upper bearing plate, rotatable in unison with the shaft, rests on a plurality of angularly arranged shoes. The shoes may tilt slightly with respect to its support to permit a lubricating liquid to enter between the shoes and the plate.

It is an object of this invention to provide an improved thrust bearing structure.

It is another object of this invention to simplify the construction of bearing structures of this character, particularly by reducing the fabrication operations. For this purpose, the elements contacting the bearing plates are of extremely simple construction, mounted detachably upon a tiltable support, the elements being easily replaceable.

It is another object of this invention to provide a novel bearing structure in which the wear upon the angularly spaced bearing shoes is uniformly distributed over the entire area thereof, thereby extending the useful life of the structure. For this purpose, the shoes are of disc form, and so supported that they may rotate about their own axes.

It is another object of this invention to provide a novel tiltable support for bearing shoes of this character.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

Figure 1 is a fragmentary vertical sectional view of an electric motor incorporating a thrust bearing that embodies the invention;

Fig. 2 is an enlarged sectional view, taken along the plane corresponding to line 2—2 of Fig. 1; and Figs. 3 and 4 are further enlarged fragmentary sectional views, taken along the planes indicated by lines 3—3 and 4—4 of Fig. 2.

In the present instance, the thrust bearing structure is shown in connection with an electric motor 1, having a casing 2. Within the casing 2 are a stator structure 3 and a rotor structure 4. The rotor structure 4 is mounted upon a shaft 5 by any appropriate means. The rotor structure is of the squirrel cage type, having an end ring 6.

In the present instance, the electric motor may be sealed and filled with lubricating oil or other liquid, the shaft 5 being arranged vertically.

An end bracket 7 (Fig. 1) has a cylindrical portion 8 telescoping within the lower end of the casing 2. Attached to this bracket, as by cap screws 9, is a cover member 10. This cover member carries a flexible cup-shaped sealing diaphragm 11 of flexible material which, in turn, is covered by an apertured metal plate 12. In this way, a fluid-tight seal at the lower end of the casing 2 is provided.

The shaft 5 has a reduced extension 13 which is journalled in a graphite sleeve 15. This sleeve is held firmly in a bracket member 16. This bracket member 16 is attached to the cover member 10 in an appropriate manner. A plurality of grooves 14 are provided in sleeve 15 for lubrication purposes.

At its upper end the bracket member 16 is provided with an interrupted flange 17 (Figs. 1 and 3). The inner surface 18 of this flange may be conical or spherical, serving as a seat for a base member 19. This base member 19 has a spherical peripheral surface 20 adapted to engage the tapered surface 18 of flange 17. It is also provided with a central aperture 21 through which the shaft extension 13 passes. The spaces provided by the interrupted flange 17 permit ready entry of lubricant past the seat 18 and beneath the base 19 for passage to the graphite sleeve 15.

Relative rotation between the base member 19 and the bracket 16 is prevented by the aid of a pin 22 (Fig. 1), firmly fixed into the bracket member 16 and entering into an aperture 23 of the base member 19.

The base 19 serves to support a plurality of shoes 24 spaced angularly about the shaft 13. These shoes are generally of disc configuration, having upper plane circular surfaces adapted to contact and support the lower surface of a bearing plate 25.

In the present instance, six such shoes 24 are provided. The angular spacing between the adjacent edges of the shoes 24, when positioned about the shaft extension 13 as shown in Fig. 2, is slight as compared with the angular extent of the individual shoes. Accordingly, substantially a continuous bearing surface is provided by the series of shoe surfaces. The spacing between the shoes is, nevertheless, sufficient to permit some freedom of movement for the shoes.

The bearing plate 25 has a central aperture 26 through which the shaft extension 13 passes. A plurality of dowel pins 27 serve rotatably to couple the bearing plate to the rotor 4 and shaft 5. These dowel pins 27 enter into recesses 28 opening only in the upper reverse surface of the bearing plate 25, as well as into appropriate recesses 29 in the end ring 6.

In order to provide an appropriate smooth bearing surface, the bearing plate 25 may be made from a mixture of crystalline and amorphous carbon appropriately compressed and baked.

For supporting the shoes 24 on the base 19, a plurality of supporting plates 30 are provided. These plates 30 are generally of quadrilateral configuration. The supporting plates 30 are oriented angularly on the base 19 by the aid of pins 31. Two such spaced pins 31 are provided for each supporting plate 30, each between the supporting plate 30 and the base 19. The pins 31 are loosely received in apertures 32 and 33 of the base 19 and the supporting plates 30 respectively. The pins 31 have intermediate flanges 34 resting upon the edges about the base apertures 32. The edges about the supporting plate apertures 33 rest upon these flanges 34.

The pins 31 are located at opposite apices of the supporting plates 30. The apertures 32 of the base 19, in which the pins 31 are accommodated, fall along a line $r$ extending radially toward the axis of rotation of the shaft extension 13. The pins 31, having clearance in the apertures 32 and 33 of the base and supporting plate respectively, readily permit tilting of the plate about an axis defined by the radial line $r$.

Two shoes 24 are mounted upon each supporting plate 30 and on opposite sides of the line $r$ about which the supporting plate readily tilts. For this purpose, pins 35, similar to the pins 31, are loosely received in apertures 36 of the supporting plates 30, the apertures 36 being located at the other opposite apices of the supporting plate 30, and falling along a line *l* extending transversely of the radial line *r*.

The pins 35 extend with clearance into recesses 37 on the under side of the shoes 24. Flanges 38, formed integrally on the pins 35, axially locate the pins upon the supporting plate 30 and also serve as a rest for the shoes 24.

The recesses 37 of the shoes 24 extend coaxially thereof, and thus the pins 35 extending therein permit angular movement or rotation of the shoes 24 about their axes. Upon rotation of the bearing plate 25, the shoes 24 may move angularly about their own axes, and the wear upon the shoes is uniformly distributed throughout the operable area thereof.

Tilting of the support 30 about the radial axis *r* permits equalization of bearing load between the two shoes supported thereon, such tilting relatively adjusting the axial positions of the two shoes. The pins 35 mounting the shoes 24 permit limited tilting of the shoes 24 with respect to the surface of the bearing plate, permitting lubricant to enter between the bearing surfaces for lubrication purposes.

Three bearing supporting plates 30 are provided in the present instance, each supporting plate carrying two shoes 24. The supporting plates 30 are equiangularly spaced about the base 19, and within narrow limits define the angular position of the shoes 24 about the shaft extension 13.

The shoes 24 are of extremely simple construction and can be formed by simple operations. They are easily replaced, simply by axial separation from the pins upon which they rest.

By virtue of the tilting supporting structure 30 and the tiltable supports for the shoes 24 themselves, minor misalignments of the shaft 5 can be taken up by appropriate tilting movement.

The inventor claims:

1. In a thrust bearing structure: a bearing plate, a support relatively angularly movable with respect to said bearing plate about an axis; a plurality of shoe members each having a substantially circular surface opposed to said bearing plate; and a plurality of pins supporting said shoe members on said support for limited tilting movement with respect thereto and for rotation of said shoe members about their axes.

2. In a thrust bearing structure: a bearing member having a bearing surface; a base relatively angularly movable with respect to said bearing member; a plurality of supporting plates carried by the base and located about the said axis of relative movement, each of said plates being tiltable about an axis extending substantially normal to said axis of relative movement; a pair of shoe elements for each plate; and means rotatably mounting said shoe elements on opposite sides of the said axis of tilt of said plates; said shoe elements having surfaces opposed to said surface of said bearing member.

3. In a thrust bearing structure: a bearing member having a bearing surface; a base relatively angularly movable with respect to said bearing member; a plurality of supporting plates carried by the base and located about the said axis of relative movement, each of said plates being tiltable about an axis extending substantially normal to said axis of relative movement; a pair of shoe elements for each plate; and means rotatably mounting said shoe elements on opposite sides of the said axis of tilt of said plates; said shoe elements having surfaces opposed to said surface of said bearing member; said mounting means permitting limited relative tilting between the shoe members and said plates.

4. In a thrust bearing structure: a pair of relatively rotatable members, one of said members having a bearing surface extending in a plane normal to the axis of relative rotation of the members; a plurality of bearing shoes having flat surfaces engageable with said bearing surface; a plurality of shoes supporting plates; means mounting said plates on the other member for angular movement about axes substantially radial to the said axis of relative rotation, and spacing said supporting plates thereabout, said mounting means dividing said supporting plates into two portions; means mounting the shoes in pairs on said supporting plates, and on each portion thereof, said shoe mounting means permitting limited universal movement of said shoes as well as rotation of said shoes about axes substantially parallel to said axis of relative rotation.

5. In a thrust bearing device: a pair of relatively rotatable members, one of said members having a bearing surface extending in a plane normal to the axis of said device; a plurality of circular shoe elements each having a flat surface engageable with said bearing surface, each of said elements having a recess; a plurality of shoe supporting plates each generally of quadrilateral configuration, and each having apertures at the apices thereof; the other of said members having sets of apertures spaced about the axis of said device, each set of apertures being aligned radially of the axis of said device; a pair of pins for each set of apertures and received in the apertures of opposite apices of a supporting plate; and another pair of pins for the apertures of each of the other opposite apices of said supporting plates, and each received in a recess of a shoe element; all of said pins having clearance to provide titlting of said plate as well as tilting of said shoe elements.

6. In a thrust bearing device: a pair of relatively rotatable members, one of said members having a bearing surface extending in a plane normal to the axis of said device; a plurality of circular shoe elements each having a flat surface engageable with said bearing surface; a plurality of shoe supporting plates each having a pair of spaced transverse apertures; the other of said members having sets of apertures spaced about the axis of said device, each set of apertures being substantially aligned radially of the axis of said device; a pair of pins for each set of apertures and received in the apertures of said plates; and means mounting pairs of shoe elements on the plates, the elements for each plate being disposed on opposite sides of a line joining the apertures of the plate; said pins permitting limited tilting of said plates.

References Cited in the file of this patent

UNITED STATES PATENTS 1,378,544   Kingsbury _____ May 17, 1921

FOREIGN PATENTS 183,872   Great Britain _____ July 31, 1922